(12) United States Patent
Covell et al.

(10) Patent No.: US 8,724,701 B1
(45) Date of Patent: May 13, 2014

(54) USING OBJECT DECOMPOSITION TO IMPROVE THE SELECTION OF EXAMPLE-BASED PREDICTORS

(75) Inventors: Michele Covell, Palo Alto, CA (US); Vivek Kwatra, Santa Clara, CA (US); Mei Han, Palo Alto, CA (US); Saurabh Mathur, Sunnyvale, CA (US); Shumeet Baluja, Leesburg, VA (US)

(73) Assignee: Google Inc., Mountain View, CA (US)

(*) Notice: Subject to any disclaimer, the term of this patent is extended or adjusted under 35 U.S.C. 154(b) by 455 days.

(21) Appl. No.: 13/088,856

(22) Filed: Apr. 18, 2011

(51) Int. Cl.
*H04N 7/12* (2006.01)
*H04N 11/02* (2006.01)

(52) U.S. Cl.
USPC .............................. 375/240.12; 375/240.08

(58) Field of Classification Search
None
See application file for complete search history.

(56) References Cited

U.S. PATENT DOCUMENTS

| | | | | |
|---|---|---|---|---|
| 5,237,410 | A * | 8/1993 | Inoue | 375/240.12 |
| 5,933,194 | A * | 8/1999 | Kim et al. | 348/403.1 |
| 6,795,583 | B1 * | 9/2004 | Barnes et al. | 382/239 |
| 2001/0017944 | A1 * | 8/2001 | Kalevo et al. | 382/268 |
| 2006/0228048 | A1 * | 10/2006 | Forlines | 382/299 |
| 2006/0233251 | A1 * | 10/2006 | Kim et al. | 375/240.12 |
| 2009/0067709 | A1 * | 3/2009 | Gross et al. | 382/166 |

OTHER PUBLICATIONS

Baluja, S., et al., "Beyond "Near-Duplicates": Learning Hash Codes for Efficient Similar-Image Retrieval" ICPR'10, International Conference on Pattern Recognition, Aug. 20, 2010, pp. 543-547.

Barnes, C., et al., "PatchMatch: A Randomized Correspondence Algorithm for Structural Image Editing," ACM Transactions on Graphics (Proc. SIGGRAPH), Aug. 2009, 10 pages.
Cui, J., et al., "Example-Based Image Commpression," 17th IEEE International Conference on Image Processing (ICIP), 2010, 4 Pages.
Datar, M., et al., "Locality Sensitive Hashing Scheme Based on p-Stable Distributions," SoCG'04, Jun. 9-11, 2004, New York, USA, ACM, 10 Pages.
Khan, A., et al., "Content Classification Based on Objective Video Quality Evaluation for MPEG4 Video Streaming over Wireless Networks," Proceedings of the World Congress on Engineering 2009, vol. I WCE 2009, Jul. 1-3, 2009, London, U.K., 6 pages.
Kleinberg, J., et al., "Algorithm Design," Chapter 1, Introduction: Some Representative Problems, Pearson Education Inc., 2006, 13 pages.
MacQueen, J. B., "Some Methods for classification and Analysis of Multivariate Observations," Proceedings of 5-th Berkeley Symposium on Mathematical Statistics and Probability, 1967, Berkeley, University of California Press, vol. 1, pp. 281-297.

(Continued)

*Primary Examiner* — Joseph Ustaris
*Assistant Examiner* — Zhubing Ren
(74) *Attorney, Agent, or Firm* — Young Basile Hanlon & MacFarlane P.C.

(57) ABSTRACT

An image processing system is provided for encoding videos based on example-based compression. To select the dictionary predictor entries to encode a video, the image processing system reduces the complexity of the video by decomposing the video into smaller pieces. By breaking the video into the simpler pieces, it is easier to locate dictionary predictor entries that are similar to the pieces of the video. The image processing system may decompose the video into one more space-time tubes. For each space-time tube, the image processing system selects dictionary predictor entries to encode the tube.

20 Claims, 5 Drawing Sheets

(56) References Cited

OTHER PUBLICATIONS

Shlens, J., "A Tutorial on Principal Component Analysis—Derivation, Discussion and Singular Value Decomposition," Mar. 25, 2003, PCA-Tutorial-Intuition, Version 1, pp. 1-16, available at <URL:http://www.cs.princeton.edu/picasso/mats/PCA-Tutorial-Intuition_jp.pdf>.

Yianilos, P., "Data Structures and Algorithms for Nearest Neighbor Search in General Metric Spaces," NEC Research Institute Technical Report Fourth, Jun. 1992, 11 pages.

Grundmann, M., et al., "Efficient Hierarchical Graph-Based Video Segmentation," CVPR, 2010, pp. 1-8.

* cited by examiner

USING OBJECT DECOMPOSITION TO IMPROVE THE SELECTION OF EXAMPLE-BASED PREDICTORS

BACKGROUND

1. Field of Art

The embodiments disclosed herein generally relate to the field of video compression, and more specifically, to using object decomposition to improve the selection of dictionary predictor entries in example-based compression.

2. Background of the Invention

Many current visual compression techniques rely on an encoder to predict the structure of an image or video based on another image, and communicate the predictor-selection information to a decoder. The decoder reconstructs the image using the predictor-selector information. Typically, the predictor-selection information is combined with a residual signal to compensate for differences between the reconstructed image and the original image, thereby bringing each part of the reconstructed image into closer alignment with the original image.

For example, the H.264 standard for video compression predicts the structure of each macroblock of a given frame using motion fields from other reference frames. By limiting the number of reference frames (typically 1-8 frames) and the number of distinct offsets available within each reference frame (typically 100-1,000 offsets), the encoder can search through available predictions to select one that will be best, in terms of compression rate and rate-distortion.

In example-based compression, the compression technique also uses predictor-selection and transmission to encode an image or video. However, compared to H.264 and other modern video codecs, in example-based compression the number of available predictors available to the encoder is much larger than the number of predictors available to other video codecs. Typically, a dictionary used in example-based compression may comprise a massive collection of predictors on the order of millions rather than thousands. Due to the size of the dictionary used in example-based compression, the speed with which current techniques select the best predictor from the dictionary needs improvement.

Furthermore, in example-based compression, the quality of the encoding of an image region is highly dependent on the complexity of the region and the availability of a similar region within the example-based dictionary. Videos of dynamic scenes containing multiple objects occluding each other and exhibiting rapid motions can generate complex visuals with specific characteristics. Due to the complexity of the visuals within these videos, the method in which to select dictionary predictor entries to encode the visuals needs improvement.

SUMMARY

An image processing system is provided for encoding videos based on example-based compression. The image processing system comprises a database of dictionary predictor entries that are used to encode the videos. In one embodiment, the dictionary predictor entries are portions of reference images which are used as dictionary predictor entries, or portions thereof, for encoding other images. The dictionary entries may be partitioned into a plurality of dictionaries based on content as well as region type. The dictionary entries may be classified as interior dictionary predictor entries that are representative of interior regions of reference images. An interior region is characterized by a single color and/or texture characteristic associated with the entry. Dictionary predictor entries may also be classified as boundary dictionary predictor entries that are representative of boundary regions of reference images. In one embodiment, boundary dictionary predictor entries are color independent and describe the boundary pattern of the reference image associated with each entry.

To select dictionary predictor entries to encode a video, the image processing system decomposes the video into individual units of content. By reducing the complexity of the video, the image processing system can select dictionary predictor entries that yield high-quality encoding. The image processing system decomposes the video into one or more space-time tubes; each space-time tube is a particular spatial region of a video over a period of time. The space-time tubes collectively represent the video itself and may comprise a collection of frames from the video.

Each frame of a space-time tube is divided into a plurality of portions such as macroblocks. Each portion in a space-time tube is classified as either an interior portion of the space-time tube or a boundary portion of the space-time tube. The image processing system selects a single interior dictionary predictor entry to encode all the interior portions of the space time tube. In contrast, the image processing system individually selects a boundary dictionary predictor entry to encode each boundary portion of the space-time tube. The selected boundary dictionary predictor entries and the interior dictionary predictor entry are used to encode the video, either locally, or by providing identifiers for the entries to a remote encoding system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
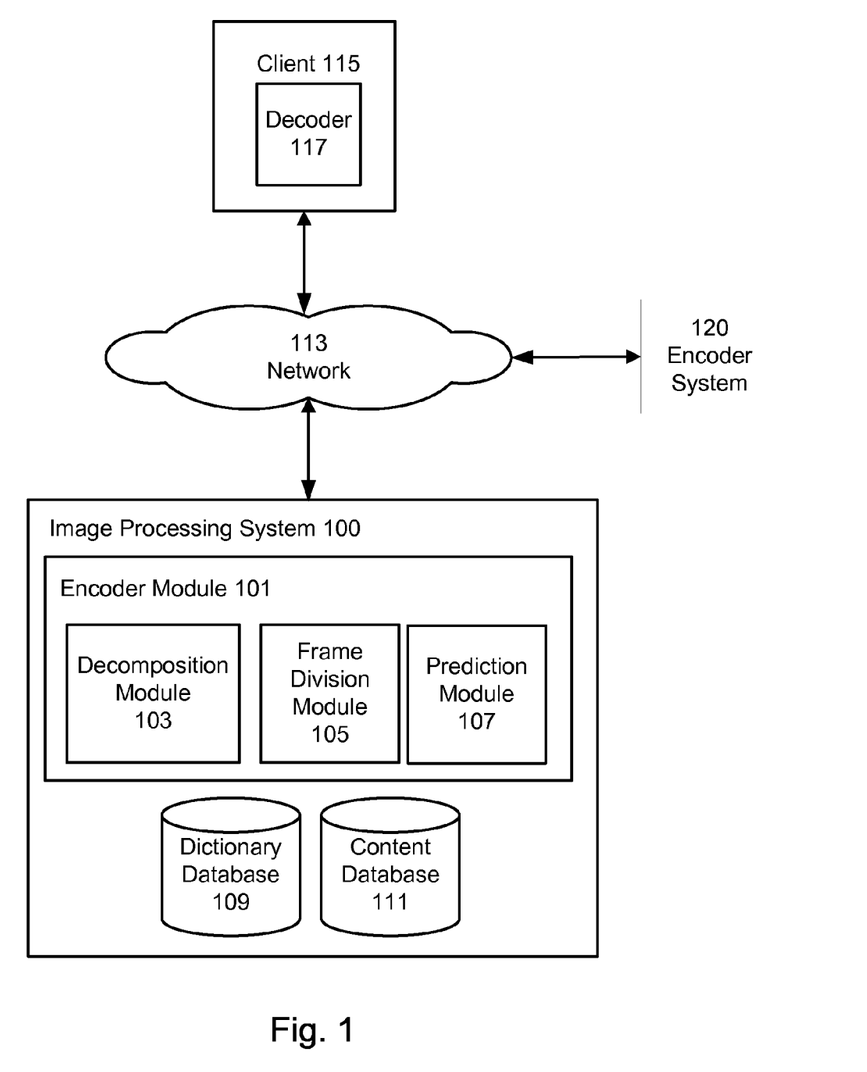
FIG. 1 is a high-level block diagram of an image processing system in accordance with one embodiment.

FIG. 1 is a high-level block diagram illustrating a detailed view of an image processing system 100 for encoding videos using example-based compression. Generally, a target video for encoding is decomposed into one or more space-time tubes where each tube is associated with a spatial region of the video over a duration of time. Thus, the space-time tubes collectively represent the video itself. For example, a video may be divided into a two space-time tubes where one tube is associated with foreground region and the other tube is associated with the background region of the video. In one embodiment, a space-time tube comprises a plurality of temporally related portions of frames (e.g., 3 frames) of the video where the variation between the object(s) in the portions of the frames within the tube is minimal. By decomposing the video into simpler pieces, the complexity of the video is reduced allowing for the selection of dictionary predictor entries that yield high-quality encoding.

In one embodiment, a client 115 executing a decoder 117 is in communication with the image processing system 100 via a network 113 such as the Internet or any combination of a LAN, a MAN, a WAN, a mobile, wired or wireless network, a private network, or a virtual private network. While only a single client 115 is shown in FIG. 1, in general very large numbers (e.g., millions) of clients are supported and can be in communication with the image processing system 100 at any time. The client 115 can be implemented using any of a variety of different computing devices, some examples of which are personal computers, digital assistants, personal digital assistants, cellular phones, mobile phones, smart phones and laptop computers. In one embodiment, the client 115 receives content such as images or videos from the image processing system 100. The decoder 117 decodes (i.e., reconstructs) videos using dictionary information provided by the image processing system 100.

As shown in FIG. 1, the image processing system 100 comprises an encoder module 101, a dictionary database 109, and a content database 111. Other modules and/or databases may be included in the image processing system 100 in other embodiments.

The content database 111 stores content for encoding (i.e., compression). The term content as employed herein includes image data in general, such as video files composed of a plurality of individual still image files or frames. Each frame may be associated with metadata describing the frame. For example, the metadata may include tags describing the substance (i.e., content) of the frame, the video associated with the frame, an author of the content or other descriptive information. This information may be used to select candidate dictionary predictor entries for encoding the frame. For example, if the metadata includes tags such as "beach" and "ocean," then a particular dictionary associated with videos and/or images from beach scenes can be selected for use.

The content in the content database 111 may be obtained from a variety of sources, such as from an organization producing professional images or videos. Likewise, images and videos may be obtained from users, e.g. as submitted by a user uploading images to a photo repository such as PICASA WEB, or a video repository such as YOUTUBE or GOOGLE VIDEO.

The dictionary database 109 stores example-based dictionaries used to encode videos from the content database 111. In one embodiment, the dictionary database 109 stores a plurality of example-based dictionaries where each dictionary is associated with a particular type of content. The type of content may be enumerated with respect to the subject matter of the content, source of the content, or author of the content, or any combination of thereof. For example, the dictionary database 109 may comprise as subject matter dictionaries such as a "beach" dictionary associated with beach images, a "building" dictionary associated with images of buildings or urban environments, and a "vehicle" dictionary associated with images of vehicles, etc. Images for each type specific dictionary can be manually curated or selected automatically based on analysis of metadata such as keywords, tags, title, as well as automated image analysis and object recognition methods.

Each dictionary may then be further organized into sub-dictionaries based on sub-classes of the subject matter of content associated with the dictionary. For example, the vehicle dictionary may include sub-dictionaries for automobiles and motorcycles, and then into further sub-dictionaries by manufacturer. By organizing the dictionaries based on content, the selection of dictionary predictor entries to encode a target frame is improved since the selection may be localized to a specific dictionary based on the content of the target frame.

Each dictionary in the dictionary database 109 comprises dictionary predictor entries. A dictionary predictor entry may comprise of an image. In other words, the images constituting the dictionary entries may comprise whole images at one or more sizes (e.g., 160×120, 320×240, 640×480, 800×600, 1280×720, etc.). Alternatively, a dictionary predictor entry may comprise an image patch that is formed from a smaller portion (i.e., regions) or blocks (sub-window) of a whole image. Typical patch sizes can range from 2×2 pixels to 128×128 pixels. Alternatively, a dictionary entry may be a video cube that comprises a plurality of frames that are temporally related to one another, for example a set of three frames over a 0.2 second period (at 15 fps). In one embodiment, the dictionary entries may be indexed into tables of a relational database, although other database schemes may be used to store the dictionary entries.

In one embodiment, each dictionary in the dictionary database 109 is classified as either a border dictionary or an interior dictionary. An interior dictionary comprises interior dictionary predictor entries associated with interior regions of an image. In one embodiment, an interior region is a portion of an image composed of a single color and/or texture. Thus, an interior region exhibits a single characteristic in terms of color and/or texture. Because the appearance (i.e., color and/or texture) of the pixels within an interior dictionary predictor entry is homogenous, the interior dictionary predictor entry includes metadata indicative of a color identification (ID) that describes the color of the pixels within the entry. The color ID may be associated with the RGB color model that describes the color of a pixel in terms of the percentage of red, green, and blue. For example, an interior dictionary predictor entry depicting the sky would include pixels associated with a single color ID describing a particular shade of blue in terms of tuple of three values between 0 and 1, corresponding to the relative percentages of red, green and blue. Other color spaces (e.g., HSV) or numerical coding system may be used. Alternatively, the pixels in an interior dictionary predictor entry may vary slightly in terms of color, but may still be associated with a single color ID. The variation may be filtered out such that the dominant color in the interior dictionary predictor entry is associated with the entry.

Figure 2:
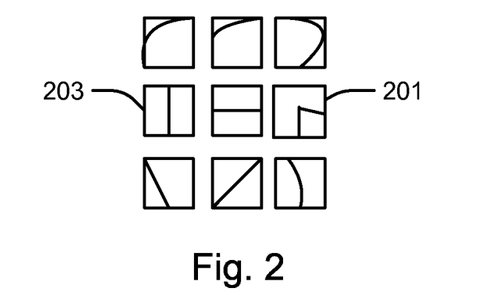
FIG. 2 illustrates examples of boundary dictionary predictor entries according to one embodiment.

In one embodiment, a border dictionary comprises border dictionary predictor entries. Rather than being associated with color and texture, each border dictionary predictor entry describes a boundary pattern from a reference image associated with the entry. Thus, border dictionary predictor entries are color/texture independent. Referring to FIG. 2, examples of border dictionary predictor entries are illustrated, for a set of M×M patches. As shown in FIG. 2, each border dictionary predictor entry illustrates a border (boundary) pattern from a reference image. The border dictionary entries thus collectively form the various border patterns that may be located in the videos from the content database 111. Generally, the patch size for a border dictionary entry may be dynamically determined by subdividing a patch depicting a boundary pattern until the boundary pattern is simpler in shape or is less complex. Patch sizes may range from 5×5 pixels to 64×64 pixels in one embodiment.

Referring back to FIG. 1, the encoder module 101 encodes videos from the content database 111. The encoder module 101 encodes the videos using example-based dictionary predictor entries selected from the dictionary database 109. After one or more dictionary predictor entries are selected to encode a video, the encoder module 101 may communicate the selected dictionary entry information to the decoder 117 in order for the decoder 117 to decode (i.e. reconstruct) the video using the information. In another embodiment, the encoder module 101 selects the predictor entries for a video, and sends those entries (or identifiers thereof) to a remotely disposed encoder system 120, which performs the final encoding using the received information.

In one embodiment, the encoder module 101 comprises a decomposition module 103, a frame division module 105, and a prediction module 107. Although not illustrated in FIG. 1, the encoder module 101 may include other modules that are used to perform the encoding process of a video as is known in the art of example-based encoding. Additionally, the encoder module 101 may include other modules other than those illustrated in FIG. 1.

The decomposition module 103 decomposes a video into one or more space-time tubes where each tube is associated with a spatial region (portion) that exhibits coherence in both appearance and motion over time within the tube. In one embodiment, a spatial region associated with the space-time tube spans across a plurality of temporally related frames of a video that compose the tube. The space-time tube excludes all other regions of the video that are not associated with the tube; that is a given spatial region in any frame is associated with one and only one tube. The decomposition module 103 decomposes the video into a plurality of tubes such that the motion of pixels within a region associated with a given space-time tube varies minimally (e.g., below some selected threshold) in the temporally related frames represented by the tube.

Figure 3A:
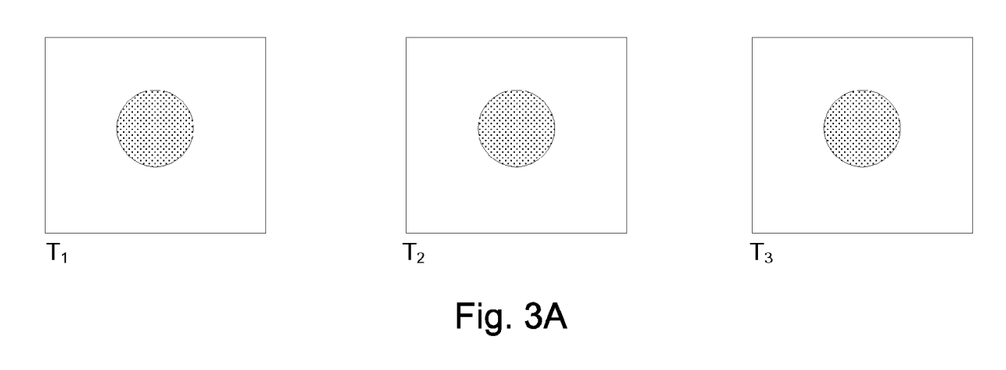
FIG. 3 illustrates an example of a space-time tube according to one embodiment.
Figure 3B:
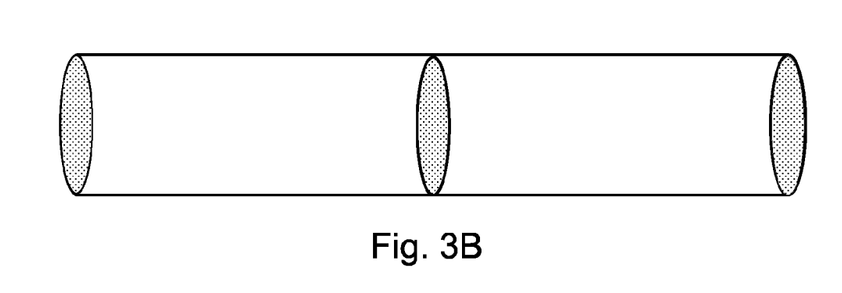

For example, FIG. 3A illustrates three frames of a video at times $T_1$, $T_2$, and $T_3$. The frames illustrate an image of a ball in all three frames where the movement of the ball across the frames varies minimally, for example staying approximately centered in the frame. The video decomposition module 103 decomposes the video into two regions corresponding to the foreground of the frames and the background of the frames. The foreground comprises the region of the frames comprising the ball whereas the background comprises the remaining region of the frames that exclude the ball. FIG. 3B illustrates the concept of a space-time tube of the foreground of the frames. The space-time tube illustrates the region of the frames corresponding to the ball across all three frames. Although FIG. 3A illustrates minimal movement across the frames, note that the absolute motion between the frames may be large while the motion variation within the region is minimal.

In one embodiment, the decomposition module 103 applies graph-based image segmentation techniques to decompose a video into one or more space-time tubes such as those described in "Efficient Hierarchical Graph-based Segmentation" by Matthias Grundmann, Vivek Kwatra, Mei Han, and Ifran Essa, Computer Vision and Pattern Recognition (CVPR 2010). During decomposition of a video, the decomposition module 103 assigns a color ID to each pixel in the video. Pixels across frames of a video that exhibit similar appearance (i.e., same color ID, or a set of IDs for similar colors) and exhibit minimal variation in motion in terms of velocity within the frames are considered a homogeneous region of the video and are therefore grouped together to form a space-time tube. By decomposing the video into simpler pieces, the complexity of the video is reduced allowing for the selection of dictionary predictor entries that yield high-quality encoding. A simple example is when a video is divided into two space-time tubes where each tube is associated with either the foreground region or background region of the video.

Figure 4:
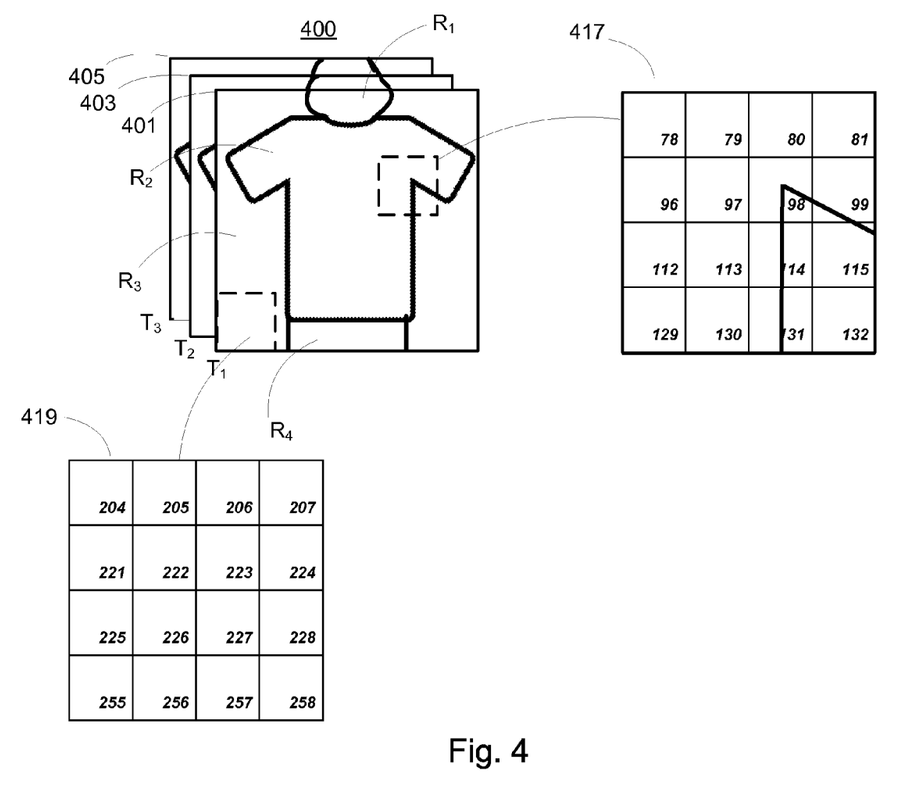
FIG. 4 illustrates a plurality of frames for encoding according to one embodiment.

FIG. 4 illustrates an example of a plurality of target frames 400 of a video that are temporally related to one another. The target frames 400 illustrate a sequence of images of a person. For exemplary purposes, the image of the person is described with respect to frame 401 which represents the first frame of the video at time $T_1$. During decomposition of the video, the video decomposition module 103 decomposes frame 401 into four regions $R_1$, $R_2$, $R_3$, and $R_4$ that respectively correspond to a face of a person, shirt of the person, background and pants of the person. In this example, each region is homogeneous in terms of color variation such that the pixels in a given region are associated with a single color ID (or set of IDs for a range of similar colors). In this example, for simplicity purposes, only four regions of the frame are identified. However, it is noted that during video decomposition, the video decomposition module 103 identifies additional regions that account for the different color variation within each identified region in FIG. 4.

The video decomposition module 103 identifies frames 403 and 405 corresponding to times $T_2$ and $T_3$ where there is minimal variation in regions $R_1$, $R_2$, $R_3$, and $R_4$. Thus, frames 400 comprise four space-time tubes corresponding to regions $R_1$, $R_2$, $R_3$, and $R_4$ that span across frames 401, 403, and 405.

In one embodiment, a space-time tube is represented as follows:

$$S_n = \{(R_n, F_j)\}$$

In the above relationship, a space-time tube $S_n$ is composed of a set of one or more region-frame pairs of the video. Each pair indicates a region $R_n$ in frame $F_j$. In the example described with respect to FIG. 4, the four space tubes are represented as follows:

$S_1 = \{(R_1, F_{401}), (R_1, F_{403}), \text{ and } (R_1, F_{405})\}$
$S_2 = \{(R_2, F_{401}), (R_2, F_{403}), \text{ and } (R_2, F_{405})\}$
$S_3 = \{(R_3, F_{401}), (R_3, F_{403}), \text{ and } (R_3, F_{405})\}$
$S_4 = \{(R_4, F_{401}), (R_4, F_{403}), \text{ and } (R_4, F_{405})\}$ The frame division module 105 divides frames of videos in the content database 111 into macroblocks. Each macroblock may be 16×16 pixels in size but other sizes may be used in alternative embodiments. Specifically, for each frame of a video to be encoded, the frame division module 105 divides the frame into a grid of macroblocks (blocks or portions) which are separately encoded by the encoder 101. Where the regions of a space-time tube are larger than the macroblock size, the regions of a space-time tube of a given video are also divided into a grid of macroblocks. FIG. 4 illustrates an example of a frame 401 which has been divided into a plurality of macroblocks. Particularly, FIG. 4 illustrates the macroblocks of areas 417 and 419 of the frame 401 where each macroblock is identified by an identifier assigned by the frame division module 103. Because the frames within a space-time tube have minimal variation across the frames, a given block in a first frame of the space-time tube includes similar content as the corresponding block in the other frames of the space-time tube. For example, macroblock 114 from frame 401 includes similar content as macroblocks 114 from frames 403 and 405.

Additionally, for each macroblock the frame division module 105 identifies a region associated with the macroblock. In one embodiment, a macroblock is associated with at least one region identified by the decomposition module 103. Because a macroblock can vary in color, texture, or other properties used for identifying regions, a given macroblock may be a part of multiple regions of a frame and is accordingly associated with each of those regions. For example, the frame division module 105 associates macroblock 114 of area 417 with regions $R_2$ and $R_3$ that correspond to the shirt region and background region of the frames 400. In contrast, the frame division module 105 associates macroblock 204 of area 419 with only region $R_3$.

Referring back to FIG. 1, the prediction module 107 selects candidate dictionary predictor entries from the dictionary database 109 to encode space-time tubes of videos from the content database 111. Specifically, for each macroblock of a space-time tube, the prediction module 107 assigns (i.e., selects) a candidate dictionary predictor entry to encode the macroblock. Because each macroblock is similar in terms of color, texture, or boundary as its corresponding macroblocks across frames of the space-time tube, a selected dictionary predictor entry for a macroblock of a given frame may be used to encode corresponding macroblocks in the other frames of the tube. For example, in FIG. 4 the dictionary predictor entry selected for macroblock 78 of area 417 from frame 401 may be used to encode macroblock 78 in frames 403 and 405. Alternatively, the prediction module 107 may individually select a dictionary predictor entry for each macroblock of the space-time tube.

In one embodiment, a set of dictionary predictor entries $PS_n$ for a given space-time tube $S_n$ is represented by the following relationship:

$$PS_n = \{(R_n, F_j, B_i, D_k, RS)\} \text{ where:}$$

$R_n$ is the region associated with the space-time tube $S_n$;
$F_j$ is a frame within the space-time tube $S_n$;
$B_i$ is a macroblock within the frame $F_j$;
$D_k$ is a dictionary predictor entry for encoding the macroblock $B_i$; and
RS is the residual difference between the macroblock $B_i$ and the dictionary predictor entry $D_k$.

To identify the set of dictionary predictor entries $PS_n$ for a given space-time tube $S_n$, the prediction module 107 identifies macroblocks $B_i$ that collectively form the region $R_n$ associated with the tube $S_n$. From the identified macroblocks $B_i$, the frame prediction module 107 identifies those macroblocks comprising pixels with the same (i.e., a single) color ID and/or texture. These set of macroblocks exhibit a single appearance characteristic. Macroblocks with a single appearance characteristic are indicative of an interior region of the space-time tube $S_n$.

For each of the macroblocks $B_i$ in the set with the same color ID and/or texture, the prediction module 107 performs a pseudo-random search of the dictionary database 109. The prediction module 107 searches the dictionary database 109 for a candidate predictor entry to encode each macroblock $B_i$ in the set. Because each macroblock $B_i$ in the set is indicative of an interior region of the space-time tube $S_n$, the prediction module 107 may localize the search to dictionaries classified as an interior dictionary.

Additionally, because the frames in the space-time tube $S_n$ are associated with metadata describing the content of the frames, the prediction module 107 randomly selects the candidate interior dictionary predictor entry from an interior dictionary based on the content of the frame as well as the color ID associated with the macroblock. The prediction module 107 may select the candidate interior dictionary predictor entry based on a metadata match. As described previously, each dictionary entry may comprise metadata describing the image associated with the entry. Based on the metadata, the prediction module 107 may locate a dictionary from the dictionary database 109 that comprises entries associated with the content of the frames in the space-time tube. For example, if the space-time tube is associated with the ocean region of a beach scene, the prediction module 107 searches the beach dictionary for entries tagged as ocean and/or with a matching color ID as the region. Each time an interior dictionary predictor entry is selected as a candidate to encode an interior macroblock of a space-time tube, the prediction module 107 updates a count of the number of the times the entry was selected.

Once the prediction module 107 has identified a candidate dictionary predictor entry for each macroblock $B_i$ with the same color ID, the prediction module 107 identifies a single dictionary predictor entry from the candidates to encode the set of macroblocks $B_i$ with the same color ID. In one embodiment, the prediction module 107 identifies the candidate dictionary predictor entry that was selected the most number of times for the macroblocks with the same color ID. The candidate dictionary predictor entry with the highest count is selected (assigned) as the dictionary predictor entry to encode all macroblocks with the same color ID.

For example, consider the space-time tube associated with region $R_2$ illustrated in FIG. 4. For each of the interior macroblocks of region $R_2$ (e.g., macroblock 78, 79, 80, 81, 96, 97, 112, 113, 129, and 139), the prediction module 107 selects a candidate interior dictionary predictor entry to encode the blocks. The prediction module 107 maintains a count of how many times an interior dictionary prediction entry is selected as a candidate to encode an interior macroblock for region $R_2$. The candidate interior dictionary predictor entry with the highest number of counts is assigned to encode all of the interior macroblocks for region $R_2$.

Alternatively, the prediction module 107 indexes the interior dictionary prediction entries for each macroblock $B_i$ based on the frequency in which each entry was selected for the macroblocks with the same appearance characteristic. For example, the most frequent predictor would be allocated the first position in the index whereas the next most frequent predictor would be allocated the second position in the index and so on. The index may be accessed to select the dictionary entry in which to encode a macroblock $B_i$.

Additionally, the frame prediction module 107 identifies a set of blocks from the identified macroblocks $B_i$ comprising pixels with the different or mixed color IDs. These macroblocks exhibit a mixed-color characteristic. Macroblocks with pixels of mixed color IDs are indicative of a boundary region of the space-time tube $S_n$. Thus, these border macroblocks are associated with a plurality of regions $R_n$.

For each border macroblock, the prediction module 107 performs a pseudo-random search of the dictionary database 109. Because each macroblock in the set is indicative of a border region of the space-time tube $S_n$, the prediction module 107 may localize the search to border dictionaries. For each border macroblock, the prediction module 107 searches the dictionary database 109 for a border dictionary predictor entry based on the content of the frame as previously described above as well as the boundary pattern associated with the macroblock. Alternatively, the prediction module 107 searches the dictionary database 109 for a border dictionary predictor entry based on only the boundary pattern associated with the macroblock. Thus, the selection of a border dictionary predictor entry for a border macroblock is color/texture independent with respect to the pixels of the macroblock. The prediction module 107 selects for each border macroblock, a border dictionary predictor entry that closely resembles the boundary pattern in the border macroblock.

In one embodiment, to identify a border dictionary predictor entry that closely resembles the border macroblock, the prediction module 107 identifies end points (i.e., vertices) of a boundary pattern in the border macroblock. The prediction module 107 directly compares the endpoints of the border macroblock with endpoints of the border dictionary predictor entry. The comparison indicates whether the boundary pattern in the entry is similar to the boundary pattern in the macroblock based on the position of the endpoints of the border macroblock relative to the position of the endpoints of the border dictionary predictor entry. Alternatively, to identify a border dictionary predictor entry that closely resembles the border macroblock, the prediction module 107 rasterizes a border macroblock by filling two sides of the boundary pattern in the macroblock with different colors (e.g., black and white). The prediction module 107 compares the shape of the colored patches with that of the border dictionary predictor entry to identify whether the boundary patterns are similar.

For example, consider the border macroblock 98 from area 417 shown in FIG. 4. The prediction module 107 may select boundary dictionary prediction entry 201 shown in FIG. 2 to encode macroblock 98 because the boundary pattern of entry 201 resembles the boundary pattern of macroblock 98. In another example, consider macroblock 114 of area 417 in FIG. 4. Similarly, the prediction module 107 may select boundary dictionary prediction entry 203 from FIG. 2 to encode macroblock 114 due to the similarly of the boundary pattern in the entry 203.

The encoder 101 transmits the set of entries $PS_n$ for each space-time tube $S_n$ of a video to the decoder 117 on the client 115 upon request of the video. The decoder 117 reconstructs the video using the set of dictionary predictor entries $PS_n$. As noted previously, the selection of border dictionary predictor entries for border macroblocks is color independent. The decoder 117 obtains the color IDs for the border macroblocks based on the regions associated with macroblock. Particularly, the decoder 117 performs color or texture extension based on the color IDs associated with the regions of the macroblock.

Consider an example where the decoder 117 is reconstructing macroblock 114 shown in FIG. 4. Macroblock 114 is associated with regions $R_2$ and $R_3$. The decoder 117 identifies the color ID associated with region $R_2$ and extends the color of the interior macroblocks (e.g., macroblock 113) of region $R_2$ to the border of macroblock 114. Similarly, the decoder 117 identifies the color ID associated with region $R_3$ and performs texture extension to the border of macroblock 114 based on the color ID of the interior macroblocks (e.g., macroblock 132) of region $R_3$.

Method of Dictionary Predictor Entry Selection

Figure 5:
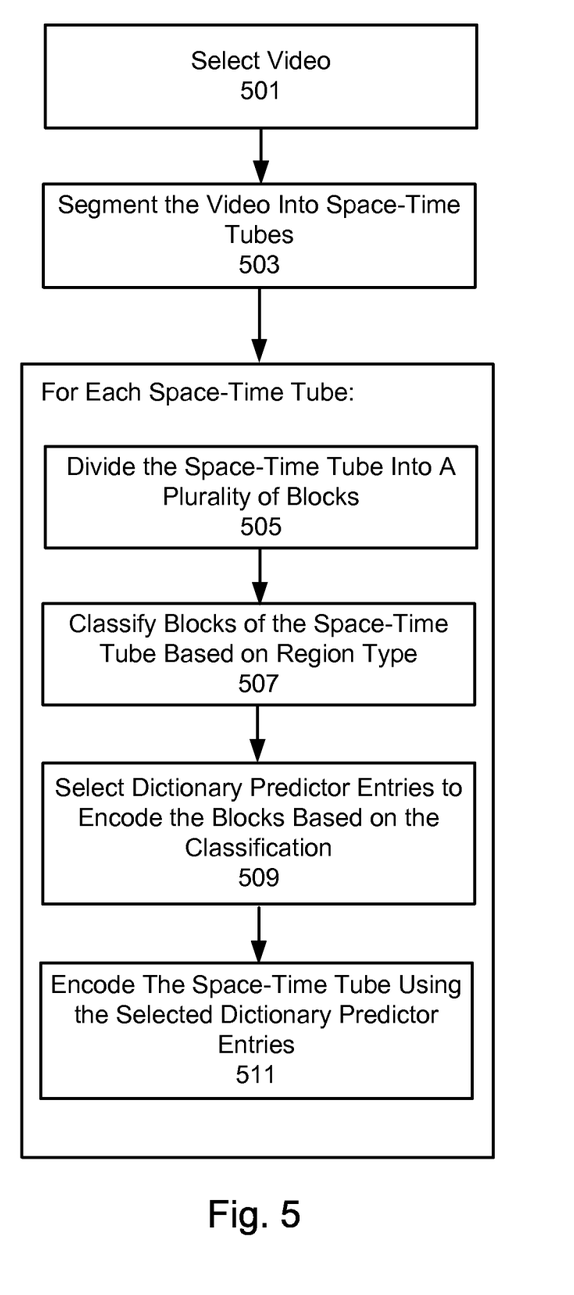
FIG. 5 illustrates steps performed by an image processing server to select dictionary predictor entries to encode a video in accordance with one embodiment.

FIG. 5 is one embodiment of a method performed by the image processing system 100 to select dictionary predictor entries for encoding a video. Other embodiments perform the illustrated steps in different orders, and/or perform different or additional steps.

In one embodiment, the image processing system 100 selects 501 a video for encoding. The image processing system 100 decomposes 503 the video into one or more space-time tubes. As previously described, each space time-tube comprises the same region across a plurality of temporally related frames of a video that compose the tube.

For each space-time tube, the image processing system 100 divides 505 the tube into a plurality of blocks such as macroblocks. That is, the image processing system 100 divides the frames of the tube into macroblocks. The image processing system 100 classifies 507 each block of the space-time tube based on region type. In one embodiment, each block is classified as either an interior block or a border block. Interior blocks are associated with a single color ID whereas border blocks are associated with a plurality of color IDs indicative of a boundary region in the blocks.

The image processing system 100 selects 509 dictionary predictor entries to encode the blocks based on the classification of each block. For each interior block of the space-time tube, the image processing system 100 searches the dictionary database 109 for candidate interior dictionary predictor entries. In one embodiment, the candidate interior dictionary predictor entry selected the most number of times for the interior macroblocks of the tube is selected as the dictionary predictor entry to encode all the interior blocks of the space-time tube. Alternatively, the image processing system 100 may select from the top-k candidate interior dictionary predictor entries for each interior block to encode the block.

For border blocks of the space-time tube, the image processing system 100 searches the dictionary database 109 for border dictionary predictor entries. For each border block, the image processing system identifies a border dictionary predictor entry that exhibits a boundary similar to the boundary pattern of the border block. Thus, the selection of the border dictionary predictor entry is color independent. Once selection of the dictionary predictor entries for the space-time tube is complete, the image processing system 100 encodes 511 the space-time tube using the selected dictionary predictor entries.

The above-process is repeated for each space-time tube of the video. Responsive to receiving a request for the encoded video from a client 115, the image-processing system may transmit to the decoder 117 the selected dictionary predictor entries to reconstruct the video.

The above disclosure has been described in particular detail with respect to one possible embodiment. Those of skill in the art will appreciate that other embodiments may be practiced. First, the particular naming of the components and variables, capitalization of terms, the attributes, data structures, or any other programming or structural aspect is not mandatory or significant, and the mechanisms that implement the embodiments or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as determining or displaying or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the above disclosure is not described with reference to any particular programming language. It is appreciated that a variety of programming languages may be used to implement the teachings as described herein, and any references to specific languages are provided for invention of enablement and best mode.

As illustrated in FIG. 1, the image processing system 100 comprises various modules. As is known in the art, the term module refers to computer program logic utilized to provide the specified functionality. Thus, a module can be implemented in hardware, firmware, and/or software. In one embodiment, program modules are stored on a storage device, loaded into memory, and executed by a computer processor or can be provided from computer program products (e.g., as computer executable instructions) that are stored in non-transitory computer-readable storage mediums (e.g., RAM, hard disk, or optical/magnetic media). Additionally, those of skill in the art will recognize that other embodiments of the image processing system 100 shown in FIG. 1 can have different and/or other modules than the ones described here, and that the functionalities can be distributed among the modules in a different manner.

The embodiments disclosed herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A method, comprising:
    decomposing, by a system including a processor, a video into one or more space-time tubes, wherein each space-time tube comprises respective regions of a plurality of temporally related frames of the video, wherein the regions of the space-time tube have a motion variation between the plurality of temporally related frames meeting a first threshold and a color variation between the plurality of temporally related frames meeting a second threshold, wherein regions of each space-time tube are distinct from regions of other space-time tubes of the one or more space-time tubes;
    for each space-time tube:
        dividing, by the system, the space-time tube into a plurality of portions that collectively represent the space-time tube;
        classifying, by the system, each of the plurality of portions based on region type;
        selecting, by the system, respective dictionary predictor entries from a plurality of dictionary predictor entries to encode the plurality of portions based on the region type associated with each portion; and
        encoding, by the system, the space-time tube using the selected dictionary predictor entries.

2. The method of claim 1, wherein the dictionary predictor entries are stored in one or more example-based dictionaries.

3. The method of claim 2, wherein each of the one or more example-based dictionaries is associated with a particular subject matter and each dictionary predictor entry stored in an example-based dictionary comprises a portion of a reference image that includes content that is associated with the particular subject matter of the example-based dictionary.

4. The method of claim 1, wherein the classifying each of the plurality of portions comprises:
    identifying, from the plurality of portions, a set of portions of the space-time tube having at least one of a common color or a common texture; and
    classifying each of the portions in the set as an interior region of the space-time tube.

5. The method of claim 4, wherein the selecting the dictionary predictor entries to encode the plurality of portions comprises:
    selecting candidate dictionary predictor entries to encode the set of portions of the space-time tube, each of the candidate dictionary predictor entries exhibiting a single appearance characteristic in terms of at least one of color or texture;
    maintaining a count of a number of times each of the candidate dictionary predictor entries is selected to encode respective portions in the set; and
    selecting a candidate dictionary predictor entry to encode the set of portions of the space-time tube having a highest count.

6. The method of claim 1, wherein the classifying each of the plurality of portions comprises:
    identifying, from the plurality of portions, a set of portions of the space-time tube associated with a mixed-color characteristic, the mixed-color characteristic of each portion in the set indicative of a boundary region of the space-time tube; and
    classifying each of the portions in the set as a border region of the space-time tube.

7. The method of claim 6, wherein the selecting the dictionary predictor entries to encode the plurality of portions comprises:
    identifying respective dictionary predictor entries to encode each portion in the set, wherein a dictionary predictor entry for a portion is identified having a first boundary region shape that resembles a second boundary region shape in the portion, wherein the dictionary predictor entry is color independent.

8. A non-transitory computer-readable medium having instructions stored thereon that, in response to execution, cause a system including a processor to perform operations comprising:
- decomposing a video into one or more space-time tubes, wherein each space-time tube comprises respective regions of a plurality of temporally related frames of the video, wherein the regions of the space-time tube have a motion variation between the plurality of temporally related frames meeting a first threshold and a color variation between the plurality of temporally related frames meeting a second threshold, wherein regions of each space-time tube are distinct from regions of other space-time tubes of the one or more space-time tubes;
- for each space-time tube:
  - dividing the space-time tube into a plurality of portions that collectively represent the space-time tube;
  - classifying each of the plurality of portions based on region type;
  - selecting respective dictionary predictor entries from a plurality of dictionary predictor entries to encode the plurality of portions based on the region type associated with each portion; and
  - encoding, by the system, the space-time tube using the selected dictionary predictor entries.

9. The non-transitory computer-readable medium of claim 8, wherein the dictionary predictor entries are stored in one or more example-based dictionaries, and each of the one or more example-based dictionaries is associated with a particular subject matter and each dictionary predictor entry stored in an example-based dictionary comprises a portion of a reference image that includes content that is associated with the particular subject matter of the example-based dictionary.

10. The non-transitory computer-readable medium of claim 8, wherein the classifying each of the plurality of portions comprises:
- identifying, from the plurality of portions, a set of portions of the space-time tube having at least one of a common color or a common texture; and
- classifying each of the portions in the set as an interior region of the space-time tube.

11. The non-transitory computer-readable medium of claim 10, wherein the selecting the dictionary predictor entries to encode the plurality of portions comprises:
- selecting candidate dictionary predictor entries to encode the set of portions of the space-time tube, each of the candidate dictionary predictor entries exhibiting a single appearance characteristic in terms of at least one of color or texture;
- maintaining a count of a number of times each of the candidate dictionary predictor entries is selected to encode respective portions in the set; and
- selecting a candidate dictionary predictor entry to encode the set of portions of the space-time tube having a highest count.

12. The non-transitory computer-readable medium of claim 8, wherein the classifying each of the plurality of portions comprises:
- identifying, from the plurality of portions, a set of portions of the space-time tube associated with a mixed-color characteristic, the mixed-color characteristic of each portion in the set indicative of a boundary region of the space-time tube; and
- classifying each of the portions in the set as a border region of the space-time tube.

13. The non-transitory computer-readable medium of claim 12, wherein the selecting the dictionary predictor entries to encode the plurality of portions comprises:
- identifying respective dictionary predictor entries to encode each portion in the set, wherein a dictionary predictor entry for a portion is identified having a first boundary region shape that resembles a second boundary region shape in the portion, wherein the dictionary predictor entry is color independent.

14. A system, comprising:
- a memory, communicatively coupled to a processor, the memory having stored therein executable instructions, comprising:
  - a decomposition module configured to decompose a video into one or more space-time tubes, wherein each space-time tube comprises respective regions of a plurality of temporally related frames of the video, wherein the regions of the space-time tube have a motion variation between the plurality of temporally related frames meeting a first threshold and a color variation between the plurality of temporally related frames meeting a second threshold, wherein regions of each space-time tube are distinct from regions of other space-time tubes of the one or more space-time tubes;
  - an encoder module configured to, for each space-time tube:
    - divide the space-time tube into a plurality of portions that collectively represent the space-time tube;
    - classify each of the plurality of portions based on region type;
    - select respective dictionary predictor entries from a plurality of dictionary predictor entries to encode the plurality of portions based on the region type associated with each portion; and
    - encode the space-time tube using the selected dictionary predictor entries.

15. The system of claim 14, wherein the dictionary predictor entries are stored in one or more example-based dictionaries, and each of the one or more example-based dictionaries is associated with a particular subject matter and each dictionary predictor entry stored in an example-based dictionary comprises a portion of a reference image that includes content that is associated with the particular subject matter of the example-based dictionary.

16. The system of claim 14, wherein the encoder module is further configured to classify each of the plurality of portions including:
- identify, from the plurality of portions, a set of portions of the space-time tube having at least one of a common color or a common texture; and
- classify each of the portions in the set as an interior region of the space-time tube.

17. The system of claim 16, wherein the encoder module is further configured to select the respective dictionary predictor entries to encode the plurality of portions including:
- select candidate dictionary predictor entries to encode the set of portions of the space-time tube, each of the candidate dictionary predictor entries exhibiting a single appearance characteristic in terms of at least one of color or texture;
- maintain a count of a number of times each of the candidate dictionary predictor entries is selected to encode respective portions in the set; and
- select a candidate dictionary predictor entry to encode the set of portions of the space-time tube having a highest count.

18. The system of claim 14, wherein the encoder module is further configured to classify each of the plurality of portions including:
- identify, from the plurality of portions, a set of portions of the space-time tube associated with a mixed-color characteristic, the mixed-color characteristic of each portion in the set indicative of a boundary region of the space-time tube; and
- classify each of the portions in the set as a border region of the space-time tube.

19. The system of claim 18, wherein the encoder module is further configured to select the respective dictionary predictor entries to encode the plurality of portions including:
- identify respective dictionary predictor entries to encode each portion in the set, wherein a dictionary predictor entry for a portion is identified having a first boundary region shape that resembles a second boundary region shape in the portion, wherein the dictionary predictor entry is color independent.

20. The system of claim 19, encoder module is further configured to identify the dictionary predictor entry to encode each portion in the set including:
- fill respective sides of a portion of portions in the set with different colors to form respective colored patches; and
- compare respective shapes of the colored patches to a plurality of dictionary predictor entries to identify a matching dictionary predictor entry.

\* \* \* \* \*